Patented Dec. 22, 1936

2,065,113

UNITED STATES PATENT OFFICE 2,065,113

PROCESS OF PRODUCING LOWER ALIPHATIC AMINO ALCOHOLS

Robert Roger Bottoms, Louisville, Ky., assignor to The Girdler Corporation, Louisville, Ky., a corporation of Delaware No Drawing. Application July 19, 1934, Serial No. 736,046

10 Claims. (Cl. 260—127)

The present invention relates to an improved process for the production of lower aliphatic primary amino alcohols, particularly such compounds as 1,3-diaminopropanol-2; 1-amino-2,3-dihydroxy propane; 1-amino propanol-2; and 2-amino ethanol-1.

Primary aliphatic amines may be produced by adding the corresponding halogen compound to an excess of aqueous ammonia, and hydrolyzing the amine-halogen salt so formed with caustic alkali to liberate the free amine. This method of synthesis always produces, in addition to the desired primary amine, varying quantities of secondary and tertiary amines, through reaction of two or three halogen containing molecules with the same ammonia molecule. If the primary amine is the desired product, the formation of these secondary and tertiary amines is not desirable, because of the difficulty in separating the several amines, and because excessive quantities of the halogen compound are consumed.

The formation of secondary and tertiary amines is particularly pronounced in the production of lower aliphatic amino alcohols from the corresponding halogen alcohols or halohydrins. These halohydrins will react with ammonia rapidly even at atmospheric temperature. The primary amino alcohols first formed quickly react with other molecules of halohydrin to produce undesirable secondary and tertiary amines. Particularly is this true in instances where a dihalogen compound, such as glycerol dichlorhydrin, is used as the starting material.

It has been discovered that if the reaction be carried out under certain controlled conditions and within certain limits, the yield in the case of primary amino alcohols is almost quantitative. The present invention involves the novel steps in the process whereby substantially pure products may be obtained.

It has been discovered that if the aqueous ammonia is heated to at least 45° C., and preferably to between 45° and 80° C., before the halogen compound is added, a greatly improved yield of primary amino alcohol results. The same result cannot be obtained by the well known procedure of mixing the reacting compounds and then heating the mixture, because the reaction is so rapid at atmospheric temperature that substantial quantities of secondary and tertiary amines form almost immediately. An entirely different and new result is obtained when the aqueous ammonia is heated before the addition of the halogen alcohol.

It has also been discovered that the yield is improved if the aqueous ammonia solution contains more than 25% of ammonia, preferably at least 40% of ammonia. Aqueous ammonia containing 70% of ammonia has been successfully employed.

It has also been discovered that the yield of primary amino alcohol is improved if the aqueous ammonia contains ammonium chloride. The yield is also improved if the halogen compound is diluted with an inert solvent such as methyl or ethyl alcohol, and if this mixture is heated to above 45° C. before addition to the aqueous ammonia.

The important steps in the process of synthesis which are involved in the present invention, include heating the aqueous ammonia to above 45° C., before rather than after addition of the halogen alcohol, and employing a solution of ammonia which contains at least 25% of ammonia and preferably more than 40%. This combination of conditions requires that the reaction be carried out at elevated pressure.

The reaction just described is best carried out in a jacketed autoclave capable of withstanding the pressure which will be developed, and equipped with an agitator. The aqueous ammonia is placed in the autoclave and brought up to the proper temperature. Halohydrin is then introduced with agitation and the reaction allowed to go to completion. The excess ammonia is then drawn from the autoclave and returned to storage, and the proper quantity of caustic soda to react with the halogen present is added to the mixture. If no ammonium chloride is used, this caustic soda should be equivalent to the halogen originally present in the halohydrin. If ammonium chloride is used, an additional quantity of caustic soda equivalent to it is added. The resulting amino compound from the present method of production may be conveniently separated from the salts present, and from the water and alcohol (when the latter is used), by concentration at atmospheric pressure or under a vacuum. The ammonia and alcohol may be recovered for reuse in the process.

So that the details of the present process may be better understood, there are given the following examples which are merely illustrative:

*Example 1—1,3-diaminopropanol-2*

375 grams of ammonium chloride are dissolved in 1750 grams of water and the mixture placed in a jacketed autoclave, equipped with a mechanical stirrer. 3500 grams of anhydrous ammonia are added, the agitator started and the mixture heated to 45° to 55° C. by a suitable heating medium in the jacket. 450 grams of glycerol dichlorhydrin are dissolved in 350 c. c. of methyl alcohol and the mixture added to the autoclave gradually over a period of five minutes.

After 45 minutes, the excess ammonia is pumped back to storage, and the mixture is removed from the autoclave and placed in a still. 560 grams of caustic soda are added and dissolved, and the liberated ammonia distilled off and collected in water to be reused.

The solution remaining in the still is then concentrated to a small volume and the sodium chloride which separates is filtered off. The amine is then taken up in 500 c. c. of ethyl alcohol and any additional sodium chloride which separates is filtered off.

The alcohol solution is then placed in a vacuum still and the alcohol and remaining water are distilled off at atmospheric pressure.

The dehydrated amine is then distilled under a vacuum of approximately 20 m. m., at which pressure it boils at 145 to 165° C. The yield of the primary amine is practically quantitative.

*Example 2—1 amino propanol-2*

3,000 grams of water containing 680 grams of ammonium chloride are placed in the autoclave and 6,000 grams of anhydrous ammonia added. The mixture is agitated and heated to 45° to 55° C., and 650 grams of 1-chloropropanol-2 are slowly added. After about 45 minutes agitation, the excess ammonia is recovered as before, the amine hydrochloride hydrolyzed with 800 grams of caustic soda and the sodium chloride separated and the amine dehydrated. The amine is then distilled at 170° to 180° C. at atmospheric pressure. The yield of primary amine is almost quantitative.

Caustic potash, alkali earth metal hydroxids and alkali metal carbonates may be employed to take up the hydrochloric acid in lieu of caustic soda. As starting materials, the chlorhydrins, such as glycerol dichlorhydrin, glycerol-monochlorhydrin, epichlorhydrin, ethylenechlorhydrin, and other halohydrins may be employed. Preferably the amino alcohols should be of straight aliphatic chain, alicyclic or heterocyclic nature, and they should perferably be devoid of phenyl nuclei.

It is generally preferable that the compound contain not more than six carbon atoms and that the total number of amino and hydroxy groups should be equal to or less than the total number of carbon atoms, with the amino compounds being equal in number to the hydroxy groups or only varying from the number of hydroxy groups by one, whether more or less.

Among the compounds to which the process of the present invention is applicable are: hydroxylated and/or aminated triethylene compounds, diethylene compounds, trimethylene compounds, dimethylene compounds, tetraethylene compounds, propyl compounds, propylene compounds, butyl compounds, butylene compounds, cyclo propane compounds, cyclo butane compounds, cyclo pentane compounds, cyclo hexane compounds, methylene-imino ring and straight chain compounds containing 1 to 6 carbon atoms and 1 to 5 amino or imino groups and/or 1 to 5 hydroxy groups, which compounds are devoid of carbonyl.

Having thus described my invention, what I claim as new and desire to secure by Letters Patent is:

1. The process of forming lower aliphatic primary amino alcohols devoid of phenyl nuclei, which comprises providing the corresponding halogen compound with the halogen in the position in which it is desired to obtain the amino group, adding this compound to an aqueous solution containing not less than 25% ammonia, contained in an autoclave, at a temperature above 45° C. and under at least such pressure as results from such heating of such aqueous ammonia, and adding an alkali after the reaction with the ammonia is completed.

2. The process of forming lower aliphatic primary amino alcohols devoid of phenyl nuclei, which comprises providing the corresponding chlorine compound with the chlorine in the position in which it is desired to obtain the amino group, adding this compound to an aqueous solution containing not less than 25% ammonia, contained in an autoclave, at a temperature above 45° C. and under at least such pressure as results from such heating of such aqueous ammonia, and adding an alkali after the reaction with the ammonia is completed.

3. The process of forming lower aliphatic primary amino alcohols devoid of phenyl nuclei, which comprises providing the corresponding chlorine compound with the chlorine in the position in which it is desired to obtain the amino group, diluting this compound with a lower aliphatic alcohol, adding the mixture to an aqueous solution containing not less than 25% ammonia, contained in an autoclave, at a temperature above 45° C. and under at least such pressure as results from such heating of such aqueous ammonia, and adding an alkali after the reaction with the ammonia is completed.

4. The process of forming lower aliphatic primary amino alcohols devoid of phenyl nuclei, which comprises providing the corresponding chlorine compound with the chlorine in the position in which it is desired to obtain the amino group, adding this compound to an aqueous solution containing not less than 25% ammonia and ammonium chloride, contained in an autoclave, at a temperature above 45° C. and under at least such pressure as results from such heating of such aqueous ammonia, and adding an alkali after the reaction with the ammonia is completed.

5. The process of forming 1,3-diaminopropanol-2, which comprises adding 1,3-dichlorpropanol-2 to an aqueous solution containing not less than 25% ammonia, contained in an autoclave, at a temperature above 45° C. and under at least such pressure as results from such heating of such aqueous ammonia, and adding an alkali after the reaction with the ammonia is completed.

6. The process of forming 1,3-diaminopropanol-2, which comprises adding 1,3-dichlorpropanol-2 to an aqueous solution containing not less than 25% ammonia, contained in an autoclave, at a temperature of 45° to 55° C. and under at least such pressure as results from such heating of such aqueous amonia, and adding caustic soda after the reaction with the ammonia is completed.

7. The process of forming 1-aminopropanol-2, which comprises adding 1-chloropropanol-2 to an aqueous solution containing not less than 25% ammonia, contained in an autoclave, at a temperature above 45° C. and under at least such pressure as results from such heating of such aqueous ammonia, and adding an alkali after the reaction with the ammonia is completed.

8. The process of forming 1-amino-2,3-dihydroxypropane, which comprises adding 1-chloro-2,3-dihydroxypropane to an aqueous solution containing not less than 25% ammonia, contained in an autoclave, at a temperature above 45° C. and under at least such pressure as results from such heating of such aqueous ammonia, and adding an alkali after the reaction with the ammonia is completed.

9. In the process of making lower amino alkylols, the step of adding a chloro alkylol to an aqueous solution containing not less than 25% ammonia, contained in an autoclave, at a temperature above 45° C. and under at least such pressure as results from such heating of such aqueous ammonia.

10. The process of forming 1,3-diaminopropanol-2 which comprises adding 1,3-dichlorpropanol-2 to an aqueous solution containing not less than 25% ammonia, contained in an autoclave, at a temperature of 45° to 55° C. and under at least such pressure as results from such heating of such aqueous ammonia, adding caustic soda after the reaction with ammonia is completed, evaporating the solution to a small volume so that a large proportion of the sodium chloride formed by the addition of caustic soda is crystallized from the mixture, separating the crystallized sodium chloride, extracting the residue with a lower aliphatic alcohol to remove the residual sodium chloride, and distilling the alcoholic solution to recover first the alcohol and finally the 1,3-diaminopropanol-2.

ROBERT ROGER BOTTOMS.